July 14, 1942.  D. W. GILL  2,290,099

CARRY-ALL FOR CHILD'S VEHICLE

Filed March 1, 1940

INVENTOR.
DONALD W. GILL.
BY Allen & Allen
ATTORNEYS.

Patented July 14, 1942

2,290,099

UNITED STATES PATENT OFFICE 2,290,099

CARRYALL FOR CHILDREN'S VEHICLES

Donald W. Gill, Cincinnati, Ohio, assignor to The Frank F. Taylor Company, Cincinnati, Ohio, a corporation of Ohio Application March 1, 1940, Serial No. 321,748

3 Claims. (Cl. 224—29)

My invention relates to article holders and carry-alls for child's vehicles and particularly for child's vehicles of the baby walker type which are convertible by the attachment of a handle and a foot support from a baby walker into a stroller or modified baby carriage.

It is the object of my invention to provide a frame which supports a flexible walled receptacle which may be quickly mounted on a baby walker and as quickly demounted and which will serve as a receptacle for the baby's toys. It is also my object to provide a package carrier or carry-all for the baby walker when the handle and foot support is in position and the baby's mother or nurse is using the vehicle as a stroller, baby carriage or perambulator for taking the baby for an outing or to the shops and where the carry-all will serve as a receptacle in which the parcels purchased may be carried.

Baby carriages are usually sufficiently long for the baby to be outstretched in the body of the carriage and so, when the baby is sitting up, there is usually abundant room at the foot of the carriage for storing packages. It has, in the past, been somewhat inconvenient to use the baby walker of the preferred type to which my invention relates as a substitute for a carriage for transporting the baby when the mother is shopping because of lack of storage space for packages. A baby walker, when converted into a stroller or carriage, has great economy of space and is very light to push along so that with the addition of my package carrier, the converted walker is still light and easy to push.

The foregoing objects and other objects to which reference will be made in the ensuing disclosure, I accomplish by that certain construction and arrangement of parts of which I have shown a preferred embodiment, reference being had to the accompanying drawing in which.

Figure 1:
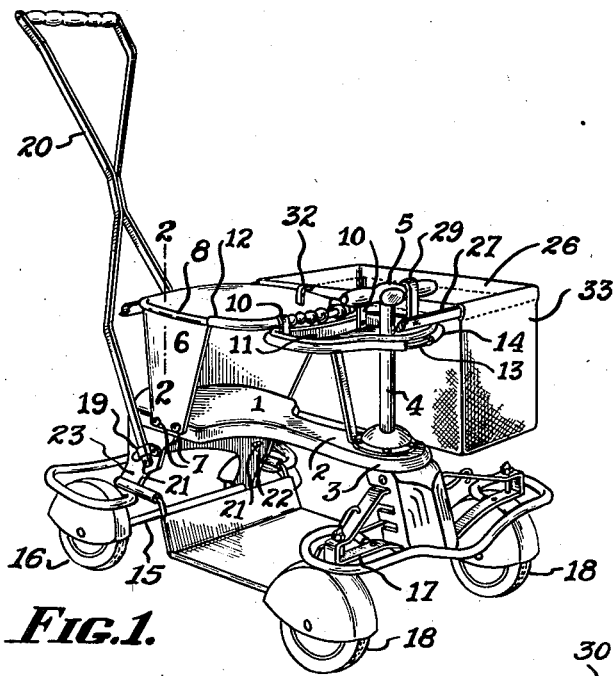
Figure 1 is a perspective view showing my improved device as attached to the child's vehicle.
Figure 2:
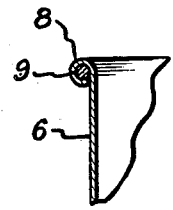
Figure 2 is a fragmentary section taken along the line 2—2 of Figure 1.
Figure 3:
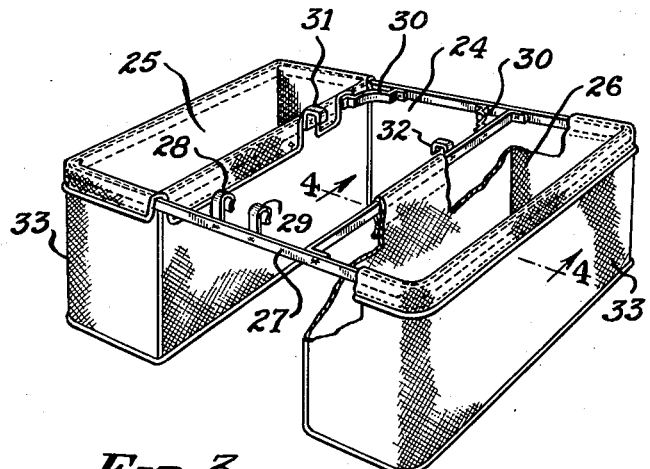
Figure 3 is a perspective view of a carry-all detached from the vehicle.
Figure 4:
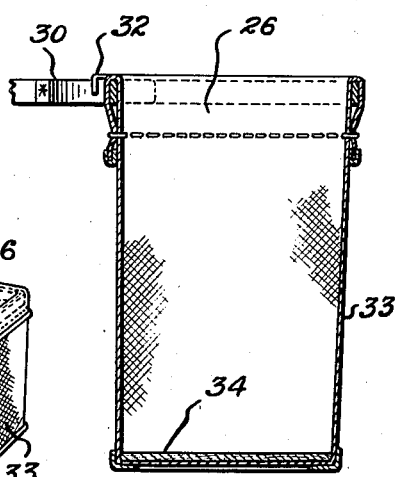
Figure 4 is a section taken along the line 4—4 of Figure 3.

The baby walker has a straddle board formed with an elongated and widened seat portion 1, a narrowed straddle bar 2 and a front portion 3 which served to mount the upright post 4 which carries the handle bars 5. The handle bars and upright post are not turnable, like, for example, the handle bars on a bicycle or velocipede.

The enlarged seat portion 1 has a continuous side and back wall 6 formed on a curve to form a retainer or enclosing member for the child. The wall 6 is bolted or screwed as shown at 7 to the side edges of the seat portion. The upper edge of the wall 6 is reinforced, as shown at 8, by a beaded portion which encloses a ring 9 which extends forwardly of the seat portion so as to provide a guard for the child when straddled on the straddle bar. The front of the ring 9 in the particular baby walker illustrated is secured with straps 10 to a tray 11. The front end of the tray is secured about the post 4.

Rubber tubing as shown at 12, surrounds the exposed portion of the ring 9 and acts as a bumper. Also the tray 11 is surrounded at the sides and front by a bar 13 also enclosed in rubber tubing 14.

Mounted on the straddle board is the back axle 15 on which the carrying wheels 16 are journaled. At the front a truss member 17 has caster wheels 18 which are freely pivoted on vertical pivots so that they are not only free to rotate on the horizontal caster spindles, but the caster frames are also free to rotate on vertical spindles. Such wheel construction makes the vehicle free to turn in the direction the child is propelling it.

Channel guards 19 are secured at the sides of the vehicle for bracing the pushing handle 20. The handle is forked as illustrated and has inturned pins 21 which fit into holes 22 in the apron 23. The handle is attached so that the vehicle may be pushed by the child's mother or nurse when the vehicle is used as a perambulator or carriage.

The baby walker and vehicle so far described, forms no part of my invention. A baby walker of this general type is shown in design Patent No. 76,829 of November 6, 1928, to which reference is hereby made. It is to the provision of a package carrier or carry-all which may be quickly mounted on the vehicle that my invention is particularly directed.

For the foregoing purpose, I provide a frame which may be rectangular, as illustrated, and preferably formed from strips of metal. The metal strips form a main rectangular enclosure 24 with a plurality of rectangular enclosures 25, 26 at the sides of the enclosure 24. The size of the main enclosure is sufficient to enclose the wall 6 and extend forwardly so that the cross strip 27 lies in front of the post 4 and so that hook members 28, 29, one on each side of the post 4, will interlock one over each bar of the handle.

At the back corners of the frame, curved strips 30 or cleats extend diagonally across the corners and these strips interlock under the bead 8. Hooks 31, 32 are also provided, one on each side to interlock with the upper edge of the wall 6. This construction makes a very rigid assembly. The strips forming the rectangular enclosures 25, 26 support flexible walls 33 of the package or toy holders or receptacles. The holders are made from flexible sheet materials forming front, back, side, and bottom walls. I may reinforce the bottom walls with plates 34 of stiff material such as thick cardboard. These cardboard plates hold out the walls and prevent sagging of the package or toy receptacles. While I have shown two receptacles, my invention also contemplates the use of one receptacle and the positioning of the receptacle or receptacles in desired positions. I have not illustrated such modifications as it will be obvious that the positioning of the receptacle supporting auxiliary frames in desired positions will readily occur to those skilled in this art.

It may be noted that in the particular structure I have described, the package holders or pockets are not reinforced by vertical supports so that they will be collapsible to conserve storage space when not in use.

While the luggage pockets are primarily for convenience when the vehicle is used as a carriage or perambulator, when the vehicle is used as a baby walker and the pushing handle and foot support are removed, a child will take just as much pleasure in using the walker. The toy pockets at the sides form a source of interest. The child will pick out toys and drop them back in the pockets again without the annoyance of having the toys drop on the floor where they would otherwise drop and be inaccessible.

The preferred method of mounting the carry-all on the baby walker is to first interlock the strips or cleats 30 under the bead at the curved line of juncture of the sides and back wall. Then by tilting the frame from an upwardly inclined angle angle to a horizontal position, the hooks 31, 32 interlock over the wall 6 and the hooks 28, 29 interlock over the handle bars. The strips 30 interlock under the bead 8 and prevent elevation of the back of the frame of the carry-all. The hooks 28, 29 spring over the handle bars and thus prevent, except with a substantial upward jerk, the elevation of the frame in front.

Having thus described my invention what I claim is new and desire to secure by Letters Patent is:

1. A carry-all, for use with a vehicle of the baby walker or stroller type, comprising a main frame of semi-rigid construction and of sufficient size to fit about the walls and handle bars of the vehicle, means for interlocking said frame with the vehicle to support the same on the vehicle and to resist detachment of said frame from the vehicle, an auxiliary frame extending from the main frame to a position clear of the vehicle and a flexible walled receptacle suspended from said auxiliary frame, said vehicle being of the type wherein a seat board is provided with enclosing side and back walls and having a reinforcing bead at the top of the walls, and said means resisting detachment of said frame comprising cleats on said main frame which interlock under said bead.

2. A carry-all for use with a standard vehicle of the baby walker or stroller type having a continuous side and back wall and handle bars, comprising a main frame of sufficient size to fit about said wall and handle bars thereby surrounding a baby seated in said vehicle, means on said frame for releasably engaging it with said vehicle to support the same on said vehicle and to resist unintentional detachment thereof from said vehicle, an auxiliary frame extending from said main frame to a position clear of the vehicle and a flexible walled receptacle suspended from said auxiliary frame.

3. A carry-all for use with a standard vehicle of the baby walker or stroller type having a continuous side and back wall and handle bars, comprising a main frame of sufficient size to fit about said wall and handle bars thereby surrounding a baby seated in said vehicle, means on said frame for releasably engaging it with said vehicle to support the same on said vehicle and to resist unintentional detachment thereof from said vehicle, auxiliary frames extending from said main frame to positions clear of the vehicle and flexible walled receptacles suspended from said auxiliary frames.

DONALD W. GILL.